(12) United States Patent
Waltermann et al.

(10) Patent No.: US 10,811,005 B2
(45) Date of Patent: Oct. 20, 2020

(54) ADAPTING VOICE INPUT PROCESSING BASED ON VOICE INPUT CHARACTERISTICS

(71) Applicant: Lenovo (Singapore) Pte. Ltd., Singapore (SG)

(72) Inventors: Rod D. Waltermann, Rougemont, NC (US); Hermann Franz Burgmeier, Chapel Hill, NC (US); Antoine Roland Raux, Cupertino, CA (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 465 days.

(21) Appl. No.: 14/745,002

(22) Filed: Jun. 19, 2015

(65) Prior Publication Data

US 2016/0372110 A1 Dec. 22, 2016

(51) Int. Cl.
| | | |
|---|---|---|
| G10L 21/00 | (2013.01) | |
| G10L 15/22 | (2006.01) | |
| G10L 15/00 | (2013.01) | |
| G10L 25/63 | (2013.01) | |
| G10L 15/183 | (2013.01) | |

(52) U.S. Cl.
CPC ............ *G10L 15/22* (2013.01); *G10L 15/183* (2013.01); *G10L 25/63* (2013.01); *G10L 2015/225* (2013.01); *G10L 2015/227* (2013.01)

(58) Field of Classification Search
CPC ....... G10L 15/02; G10L 15/083; G10L 15/20; G10L 15/221; G10L 15/124
USPC ................................ 704/200, 207, 231, 275
See application file for complete search history.

(56) References Cited

U.S. PATENT DOCUMENTS

| | | | | |
|---|---|---|---|---|
| 2004/0215453 | A1* | 10/2004 | Orbach | G10L 15/005 704/231 |
| 2014/0324428 | A1* | 10/2014 | Farraro | G10L 15/22 704/244 |
| 2015/0154492 | A1* | 6/2015 | Ponomarev | G06N 3/004 706/11 |
| 2015/0310865 | A1* | 10/2015 | Fay | G10L 15/22 704/254 |

* cited by examiner

*Primary Examiner* — Thierry L Pham
(74) *Attorney, Agent, or Firm* — Ference & Associates LLC

(57) ABSTRACT

One embodiment provides a method, including: receiving, at an audio receiver, user voice data; identifying, using a processor, at least one characteristic of the voice data; obtaining, using the processor, a speech recognition processing result of the voice data; and changing a standard response to the user voice data to an adapted response based on the at least one characteristic and the speech recognition processing result. Other aspects are described and claimed.

17 Claims, 3 Drawing Sheets

ADAPTING VOICE INPUT PROCESSING BASED ON VOICE INPUT CHARACTERISTICS

BACKGROUND

Voice assisted technology enables operation of a device through use voice instructions. This technology has become increasingly popular due to the introduction and refinement of intelligent personal assistants (e.g., SIRI, CORTANA, etc.). As a result, the number and type of devices capable of voice control and use of voice as input has steadily increased. This is especially true regarding cellular phones (e.g., smartphones), tablet devices, and laptops. Without the need to operate a device through buttons or switches, a user may use voice commands to control devices while simultaneously performing other tasks. Users may also provide voice inputs to other voice enabled applications, for example entering voice data for use as text in a messaging application. SIRI is a trademark of Apple Inc. in the United States of America and other countries. CORTANA is a registered trademark of Microsoft Corporation in the United States of America and other countries.

Although the accuracy of the voice recognition systems for faithfully identifying which words were actually spoken by the user, there still remains room for improvement in terms of how voice input should be processed. The robotic method of speech to text used in current devices fails to account subtle factors present in human communication.

BRIEF SUMMARY

In summary, one aspect provides a method, comprising: receiving, at an audio receiver, user voice data; identifying, using a processor, at least one characteristic of the voice data; obtaining, using the processor, a speech recognition processing result of the voice data; and changing a standard response to the user voice data to an adapted response based on the at least one characteristic and the speech recognition processing result.

Another aspect provides an information handling device, comprising: a processor; an audio receiver; a memory device that stores instructions executable by the processor to: receive user voice data; identify at least one characteristic of the voice data; obtain a speech recognition processing result of the voice data; and changing a standard response to the user voice data to an adapted response based on the at least one characteristic and the speech recognition processing result.

A further aspect provides a product, comprising: a storage device having code stored therewith, the code being executable by a processor and comprising: code that receives, at an audio receiver, user voice data; code that identifies at least one characteristic of the voice data; code that obtains a speech recognition processing result of the voice data; and code that changes a standard response to the user voice data to an adapted response based on the at least one characteristic and the speech recognition processing result.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
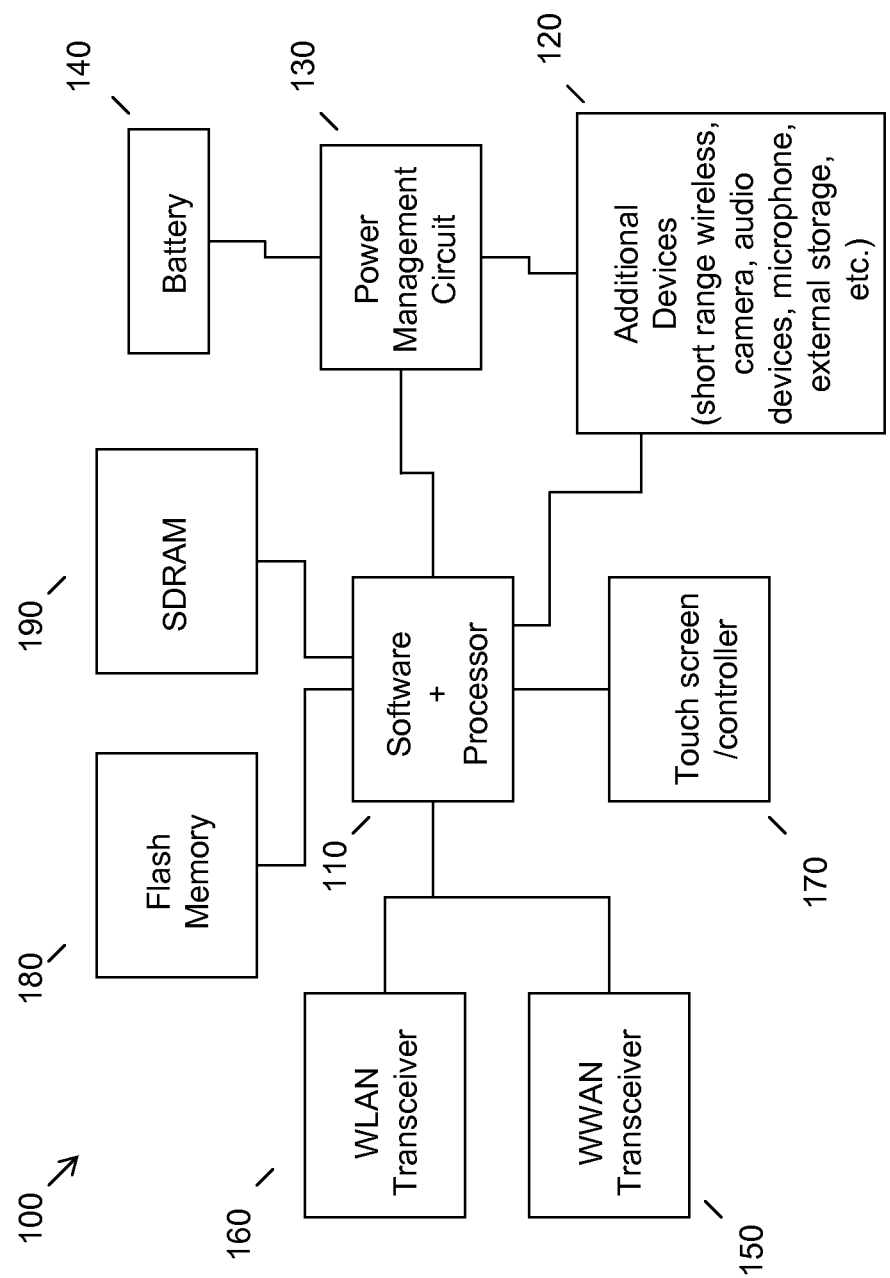
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

The operation of devices through voice commands is becoming more popular, especially for smart phones that have small or no keyboards as well as other devices designed for mobility. One of the most prominent uses for voice commands is the use of an intelligent digital personal assistant. These personal assistants can perform a variety of tasks or services for users. These tasks or services can be determined based on not only a user's voice command, but also by: location, information access, user schedule, etc. Through utilization of all of the data available, the intelligent assistant can better understand the intent of the user and more accurately perform the user's desired task.

An embodiment improves the accuracy of voice recognition systems in terms of how the voice input data is used to perform certain actions. For example, when users from a wide variety of backgrounds speak to a system for a wide variety of purposes (dictation, commands, search queries, etc.), the user's expected result may differ, even if the literal transcription of the words is the same.

Conventional approaches typically rely on either small, dedicated grammars that have to be selected ahead of time depending on the intent of the utterance, and thus have good performance characteristics in a narrow range of functions, or general purpose grammar processing that attempts to cover all possible intents and user populations, but do not perform as well as tailored processing. An embodiment uses processing applied to the voice data in order to identify or determine one or more voice characteristics of the user's speech. Using the voice characteristic(s), differential processing of the voice data, along with access to other data sources (e.g., contextual data) is applied such that the result of the voice data processing matches the user's original intent more closely.

For example, an embodiment uses the pitch profile of an utterance, e.g., as extracted from the audio signal, to estimate or categorize characteristics of the speaker (e.g., age, gender, level of frustration or other emotion), as well as of the utterance intent (e.g., dictation, request or query, complaint, etc.). The grammar (or statistical language model) used to recognize the utterance thus may be selected among previously prepared ones for classes of speaker and utterance characteristics (e.g., a general dictation grammar, a grammar capturing request, one capturing complaints). Different age groups, with different vocabulary and language patterns can also be represented by distinct grammars. This data can be combined with additional context inferences, such as location (e.g., current or destination), calendar (e.g., present or upcoming), open applications, active presentations, etc. The combination of this data provides a mechanism for the system to react in a more natural way.

For example, a speech recognition system may react to voice data in a way that infers what the user is upset/stressed/happy about when the voice data is provided. This can also be leveraged to assist with terms such as colorful metaphors or terms of endearment that user may have for others during times of stress, or anger. By way of example, if a user is stressed about his or her next meeting, and asks "Where is that file I need to present," while the user did not explicitly state that this is for an upcoming meeting, an embodiment may take into account a voice characteristic indicative of stress or urgency, and therefore choose to access calendar entries in the near future that may include the user. This would use the fact that the user is asking for data with a stressful tone, and may be frustrated already, so an embodiment infers information, rather than adding to the stress by asking additional questions. As such, the processing of the voice data is altered by detecting a voice characteristic of the voice input, yielding a different response to the user's query.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an audio receiver such as a microphone that receives sound and converts the sound into electrical signals used by a speech recognition system, as further described herein. System 100 often includes a touch screen 170 for data input and display/rendering. System 100 also typically includes various memory devices, for example flash memory 180 and SDRAM 190.

Figure 2:
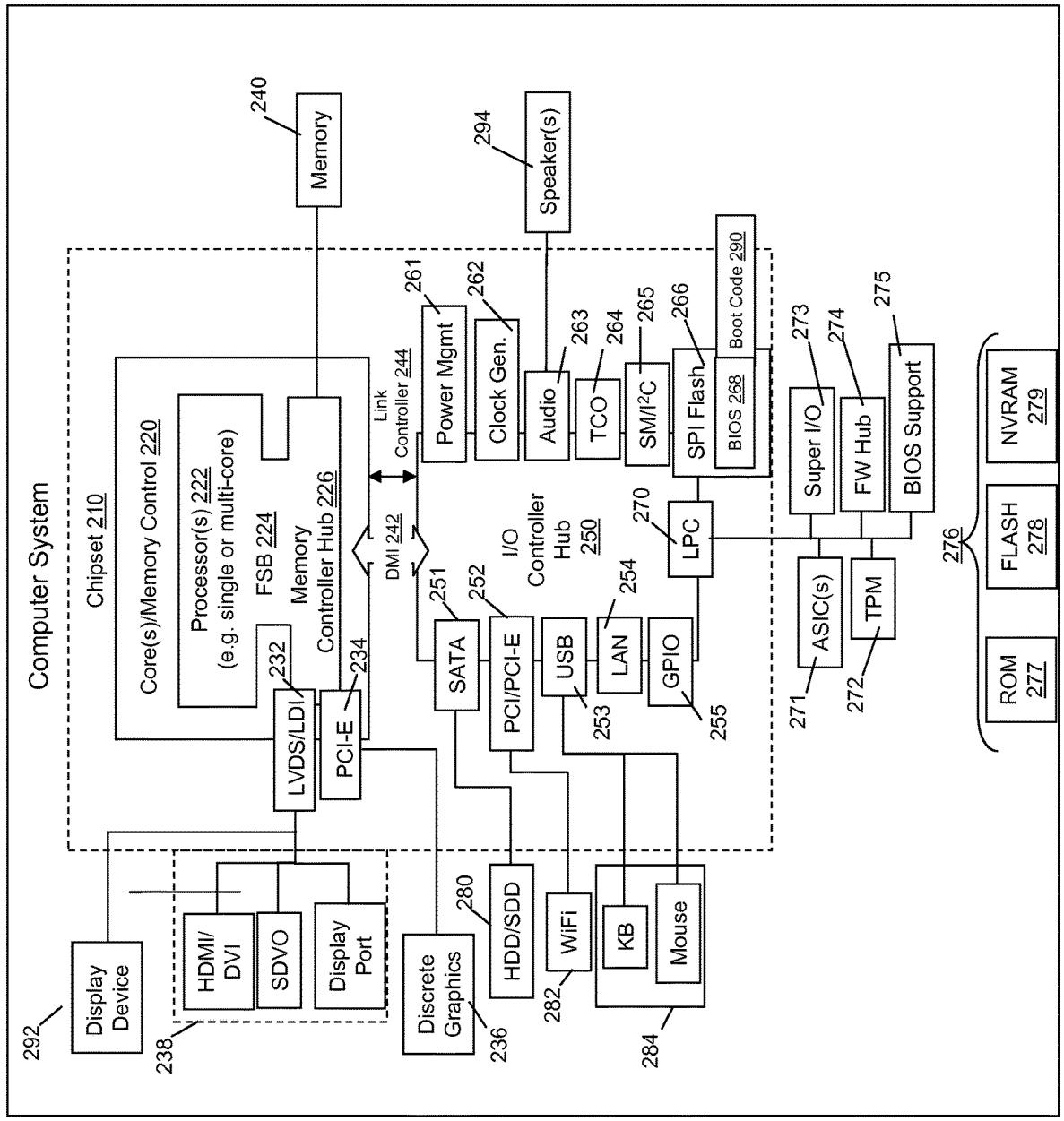
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may to use to perform a variety of functions based on voice data input. For example, the circuitry outlined in FIG. 1 may be implemented in a tablet or smart phone embodiment, whereas the circuitry outlined in FIG. 2 may be implemented in a personal computer embodiment.

Figure 3:
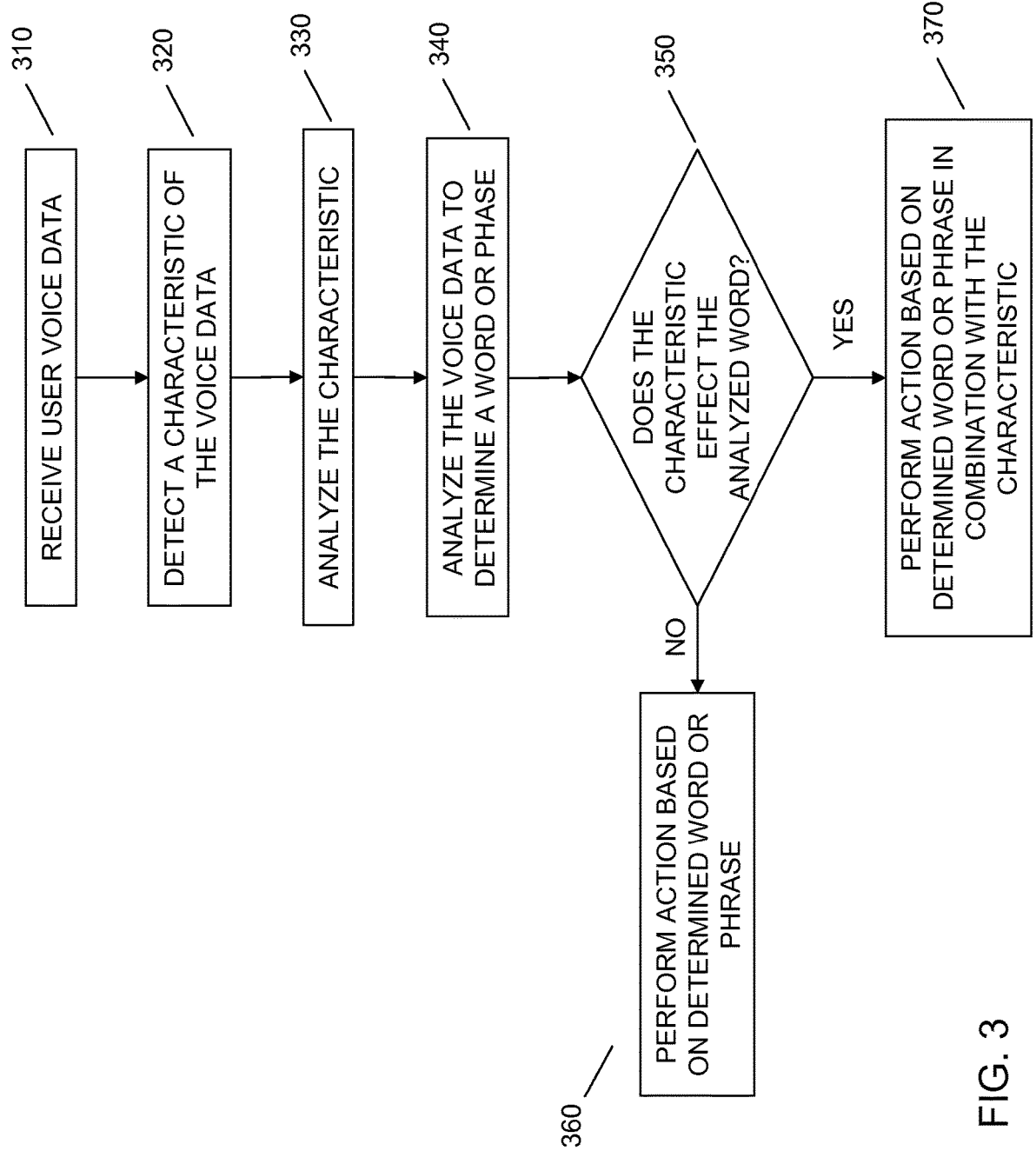
FIG. 3 illustrates an example method of utilizing voice commands based on voice characteristics.

Referring now to FIG. 3, an embodiment receives user voice data at 310. The voice data is captured by an audio device (e.g., an audio receiver such as a microphone on a smartphone, tablet, PC, etc.). In addition to voice data, the audio device can capture any relevant audio within the range the device. For example, a user may provide voice data (e.g., a word, a phrase, a command, a query, etc.) to a variety of voice enabled applications, for example, a virtual assistant, speech to text enabled applications (e.g., messaging, navigation, map, note taking, etc.).

In an embodiment, the voice data may be received responsive to activation of a voice enabled application. For example, a device may utilize a trigger word or phase to launch an application (e.g., a virtual assistant). Although some of these trigger phrases may include voice data variance (e.g., pitch, speed, volume, etc.) no determination is made regarding that variance other than the predetermined function of opening a specific application (e.g., SIRI, CORTANA, etc.). However, in an embodiment, once a conventional virtual assistant or like application is active, the voice characteristics may be analyzed and used to modify or enhance an application's function as a whole as described herein.

Once the voice data is received at 310, it may be processed to not only faithfully identify word(s) contained there but also to detect voice characteristics, e.g., pitch, amplitude, timing, etc. The voice data may be parsed to search for and detect various characteristics of the voice data at 320. For example, the pitch of the voice input may be detected. The pitch profile of an utterance may be extracted from the audio signal of the user's voice data. In addition to the pitch, various other characteristics can be extracted from the user's voice data. Such as, for example, the speed or tempo of the voice data (e.g., how quickly the user is speaking or time duration between syllables) and the volume of the voice data (e.g., is the user yelling or speaking softly). In a further embodiment, these detected characteristics may be required to exceed a predetermined threshold (e.g., the pitch must be above or below a certain level) in order to have an effect on the voice data. Thus, once the voice data is received at 310, voice characteristics are detected at 320, which could, depending on predetermined threshold levels, be interpreted to alter or modify the plain meaning of the voice input received at 310, as further described herein.

The detected characteristics are analyzed at 330. Inferences can be drawn based on a statistical analysis of the characteristics. For example, based on a pitch profile, an embodiment can determine various factors about the individual inputting the voice data (e.g., age, gender, emotional state, etc.). As described herein, this may influence the selection of a grammar for use by the speech recognition engine and/or the obtaining of other data for use in processing the voice input, e.g., contextual data such as location, calendar entries, received communications such as text messages or emails, etc. As an example, if the user's voice input is smooth and consistent, this may be interpreted as standard input, e.g., dictation input. In contrast, if the phrase was provided in a hurried manner and ended in an upward inflection, an embodiment may select a different grammar or access additional data in order to process the voice data. As such, an embodiment may process the same voice data to be a request or query to search rather than dictation input, given the different speech characteristics. Those skilled in the art will recognize that the intents discussed above are non-limiting in nature and that various other user intents are possible (e.g., demands, statements, complaints, communication requests, etc.).

The analyzed characteristics at 330 may be used to create or select a statistical language model. For example, a grammar utilized by the speech recognition system may be selected based on the nature of the voice data. The statistical model may also take into account typical speech characteristics used by specific individuals (e.g., of a particular age, gender, location, etc.) to further increase the accuracy of the speech to text conversion as well as enabling differential output functionality, as described herein. The model can be based on samples taken during any process that involves user speech. For example, a grammar may be prepared and selected for a general dictation voice input, a grammar may be prepared and selected for processing requests, a grammar may be prepared and selected for processing complaints, etc. Thus, given a voice characteristic of the current voice input, a grammar matching that characteristic may be utilized in processing the current voice data.

An embodiment may use the analyzed characteristics to enhance a prediction at 340. For example, user may have a very different vocabulary based on certain traits (e.g., users of different age groups, gender, professions, etc.) and those traits can be helpful in determining the most statistically probably vocabulary and thus intended meaning. These varied vocabulary and language patterns may also be represented by distinct grammar (e.g., colloquialisms, accents, clarity, articulation, pronunciation, fluency, etc.). In an embodiment, this data can be combined with additional data that permit context inferences, such as location data (e.g., current or destination), calendar data (e.g., present and upcoming), data regarding open applications, active presentations, etc., to further enhance prediction(s) made at 340 regarding how the voice data should be processed.

The combination of the plain word meaning and the contextual characteristics of the voice data and/or other contextual data provide a way for a device to react in a more natural way. This allows the application or agent to infer if the user is experiencing a certain emotional state (e.g., upset, stressed, happy, anxious, etc.) which can be leveraged to assist with words, phrases or functionality that a typical speech to text recognition tool might struggle with. For example, terms of endearment or terms such as colorful metaphors that the user may have for others during times of stress or anger may yield a null result in a conventional virtual assistant, whereas contextual cues utilized by the various embodiments permit an appropriate understanding of this ambiguous voice data and appropriate processing and use thereof.

Returning to the specific example described above, if a user is stressed about an upcoming meeting and asks a virtual assistant or search tool "where is that file I need to present," while the user may not state specifically which file or which meeting the phrase was in reference to, an embodiment takes into account, by virtue of the user's voice data characteristics (e.g., different pitch, timing or amplitude of speaking) any calendar entries in the near future that include the user based on the detected urgency or stress in the user's voice. Therefore, the fact that the user is asking for a file or data with a stressful or frustrated tone allows information to be inferred by an embodiment.

Although the analyzed characteristics are valuable when determining a user's intent, they may also be a hindrance during the typical process of speech to text conversion. Thus, an embodiment may filter (e.g., standardize the pitch, speed, and volume) and separately analyze the voice data to determine a word or phrase at 340. During this process, voice data may be analyzed separately to convert the voice data into machine text and detect voice characteristics. This allows an application or intelligent agent to parse the user input and use the characteristics to optionally change the voice data processing, e.g., optionally select a different response to the voice input is a characteristic exceeds a predetermined threshold. Alternatively, an embodiment may analyze the voice data without filtering the characteristics.

Once the characteristic is detected at 320 and analyzed at 330 and 340, respectively, an embodiment makes a determination as to the relevance of the detected characteristics at 350. For example, the analyzed characteristics may indicate that the user is experiencing a stressful emotional state. Thus, as mentioned above an embodiment may use those characteristics to modify the subsequent action taken regarding the user's inputted voice data (e.g., searching a calendar for imminent meetings or presentations) at 370.

Alternatively, a determination could be made no characteristic exists or that no characteristic exceeded a predetermined threshold limit at 360. In this scenario, an embodiment may perform an action based on the interpreted voice data alone at 340, without the aid of clarifying characteristics.

Accordingly, as illustrated by the example embodiments and figures, an embodiment provides a method of receiving a user's voice data, analyzing the voice data to detect characteristic(s) of that voice data such as pitch, volume, and tempo, etc., and to determine if the processing of the voice data (e.g., the selection of a grammar to process the voice data and/or functionality such as response thereto) should be altered or adapted given the detected characteristic(s). Once the characteristics have been analyzed a determination is made regarding the effect of the characteristics on the processing and response to the voice data input by the user.

The various embodiments described herein thus represent a technical improvement to the process of voice recognition. A great deal of information is contained within human speech that isn't accounted or used by conventional speech recognition systems that simply form a textual representation of the spoken word. The analyzing of these characteristics leads to an increased awareness by the system as to what the user actually means or intends, and likewise enhances the user experience by increasing the accuracy of the results produced by the system.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. A method, comprising:
   receiving, at an audio receiver, user voice data from a user;
   identifying, using a processor, at least one characteristic of the voice data;
   determining, based upon the identified at least one characteristic, an emotional state of the user;
   obtaining, using the processor, a speech recognition processing result of the voice data, wherein the speech recognition processing result is based upon the emotional state of the user; and
   changing a standard response by an application to the user voice data to an adapted response based on the emotional state of the user and the speech recognition processing result, wherein the changing to an adapted response comprises modifying a functionality associated with the standard response based upon the emotional state of the user.

2. The method of claim 1, wherein the at least one characteristic comprises pitch of the voice data.

3. The method of claim 1, wherein the at least one characteristic comprises speed of the voice data.

4. The method of claim 1, wherein the at least one characteristic comprises volume of the voice data.

5. The method of claim 1, wherein the obtaining comprises selecting a different grammar to process the voice data.

6. The method of claim 5, wherein the different grammar is retrieved from a remote device.

7. The method of claim 1, wherein the adapted response comprises one or more of: a response to a search query, a dictation of text derived from the voice data into a file, a schedule manipulation, and a data modification.

8. The method of claim 1, further comprising:
   determining if the at least one characteristic exceeds a predetermined threshold;
   wherein the changing is based on the at least one characteristic exceeding the predetermined threshold.

9. The information handling device of claim 1, wherein the adapted response comprises one or more of: a search query, a dictation record, schedule manipulation, and data modification.

10. An information handling device, comprising:
    a processor;
    an audio receiver;
    a memory device that stores instructions executable by the processor to:
    receive, from a user, user voice data;
    identify at least one characteristic of the voice data;
    determine, based upon the identified at least one characteristic, an emotional state of the user;
    obtain a speech recognition processing result of the voice data, wherein the speech recognition processing result is based upon the emotional state of the user; and
    changing a standard response by an application to the user voice data to an adapted response based on the emotional state of the user and the speech recognition processing result, wherein the changing to an adapted response comprises modifying a functionality associated with the standard response based upon the emotional state of the user.

11. The information handling device of claim 10, wherein the at least one characteristic comprises pitch of the voice data.

12. The information handling device of claim 10, wherein the at least one characteristic comprises speed of the voice data.

13. The information handling device of claim 10, wherein the at least one characteristic comprises volume of the voice data.

14. The information handling device of information handling device 10, wherein the obtaining comprises selecting a different grammar to process the voice data.

15. The information handling device of information handling device 14, wherein the different grammar is retrieved from a remote device.

16. The information handling device of claim 10, further comprising:
    determining if the at least one characteristic exceeds a predetermined threshold;
    wherein changing is based on the at least one characteristic exceeding the predetermined threshold.

17. A product, comprising:
    a storage device having code stored therewith, the code being executable by a processor and comprising:
    code that receives, at an audio receiver, user voice data from a user;
    code that identifies at least one characteristic of the voice data;
    code that determines, based upon the identified at least one characteristic, an emotional state of the user;
    code that obtains a speech recognition processing result of the voice data, wherein the speech recognition processing result is based upon the emotional state of the user; and
    code that changes a standard response by an application to the user voice data to an adapted response based on the emotional state of the user and the speech recognition processing result, wherein the code that changes to an adapted response comprises code that modifies a functionality associated with the standard response based upon the emotional state of the user.

* * * * *